(12) United States Patent
Mastroianni et al.

(10) Patent No.: US 6,199,652 B1
(45) Date of Patent: Mar. 13, 2001

(54) VEHICLE DRIVE WHEEL ASSEMBLY

(75) Inventors: Cesare Mastroianni, Denver, NC (US); Bernd Greiss, Oakland Township, MI (US); Ronald G. Flanary; Martin C. Piedl, both of Blacksburg, VA (US)

(73) Assignee: Vectrix Corporation, Newport, RI (US)

( * ) Notice: Subject to any disclaimer, the term of this patent is extended or adjusted under 35 U.S.C. 154(b) by 0 days.

(21) Appl. No.: 08/988,675

(22) Filed: Dec. 11, 1997

(51) Int. Cl.$^7$ ........................................................ B60K 7/00
(52) U.S. Cl. .......................... 180/229; 180/65.5; 180/68.1
(58) Field of Search ................................. 180/65.1, 65.5, 180/65.6, 65.8, 68.1, 68.4, 229

(56) References Cited

U.S. PATENT DOCUMENTS

| | | |
|---|---|---|
| 904,721 | 11/1908 | Pèrillard . |
| 2,027,592 * | 1/1936 | Hoffman et al. ...................... 74/413 |
| 2,244,875 * | 6/1941 | Framhein ............................. 172/36 |
| 2,252,967 * | 8/1941 | Forton ................................. 74/413 |
| 2,494,558 | 1/1950 | Irwin .................................. 74/750 |
| 2,588,889 | 3/1952 | Sherwood ............................ 180/33 |
| 3,387,502 | 6/1968 | Tourneau ............................. 74/391 |
| 3,686,978 | 8/1972 | Knoblach et al. ..................... 74/801 |
| 3,812,928 * | 5/1974 | Rockwell et al. ................... 180/65.5 |
| 3,820,617 | 6/1974 | Groff ................................ 180/19 R |
| 4,083,421 | 4/1978 | Van Horn et al. ..................... 180/88 |
| 4,132,281 | 1/1979 | Gaddi .................................. 180/33 |
| 4,259,809 * | 4/1981 | Mabuchi et al. ...................... 46/249 |
| 4,531,928 * | 7/1985 | Ikenoya ............................... 474/93 |
| 4,573,364 * | 3/1986 | Givan .................................... 74/7 |
| 4,618,102 | 10/1986 | Meis et al. .......................... 239/737 |
| 4,693,359 | 9/1987 | Mattei et al. ..................... 198/474.1 |
| 4,721,177 | 1/1988 | Qizhen ............................... 180/205 |
| 4,799,564 | 1/1989 | Iijima et al. ....................... 180/65.5 |
| 4,905,787 | 3/1990 | Morin ................................ 180/209 |
| 4,930,590 * | 6/1990 | Love et al. ........................... 180/55 |
| 5,014,800 | 5/1991 | Kawamoto et al. ................ 180/65.5 |
| 5,272,938 | 12/1993 | Hsu et al. ........................... 74/594.1 |
| 5,322,141 | 6/1994 | Brunner et al. .................... 180/65.5 |
| 5,382,854 | 1/1995 | Kawamoto et al. ............... 310/67 R |
| 5,427,193 * | 6/1995 | Avakian ............................ 180/65.5 |
| 5,450,915 | 9/1995 | Li ..................................... 180/65.5 |
| 5,581,136 | 12/1996 | Li ..................................... 310/67 R |
| 5,613,569 | 3/1997 | Sugioka et al. .................... 180/68.5 |
| 5,633,544 | 5/1997 | Toida et al. ....................... 310/67 R |
| 5,647,450 | 7/1997 | Ogawa et al. ...................... 180/220 |
| 5,685,798 | 11/1997 | Lutz et al. .......................... 475/331 |

* cited by examiner

*Primary Examiner*—Kevin Hurley
(74) *Attorney, Agent, or Firm*—Pennie & Edmonds LLP

(57) ABSTRACT

A vehicle drive assembly with a drivable wheel pivotably connected to a body, about an axis substantially transverse to the body, by first and second swing arms. One of the swing arms houses a motor and includes a heat dissipating member in thermally conductive association with the motor. The heat dissipating member preferably a plurality of cooling fins exposed to ambient air. The motor is housed in an end of the first swing arm opposite the body, and has a shaft that is directly engaged to a transmission within the wheel. The transmission is contained within a gearbox housing that rotates with the wheel and is formed by left and right structural gearbox halves. A wheel rim, configured to carry a tire, is attachable only to the first gearbox half, and can slide over the second half when removed from the gearbox housing, allowing the transmission to remain assembled. The interior of the gearbox housing contains a lubricant, and a vent is formed generally parallel to the motor shaft and extending through the first swing arm. Preferably, the second swing arm is detachable from the transmission while remaining substantially stationary in a direction substantially coaxial with the axle. Also, the transmission preferably includes a planetary gear reduction unit, in which planetary gears are mounted on a gear carrier that is configured to prevent rotation caused by the motor.

36 Claims, 8 Drawing Sheets

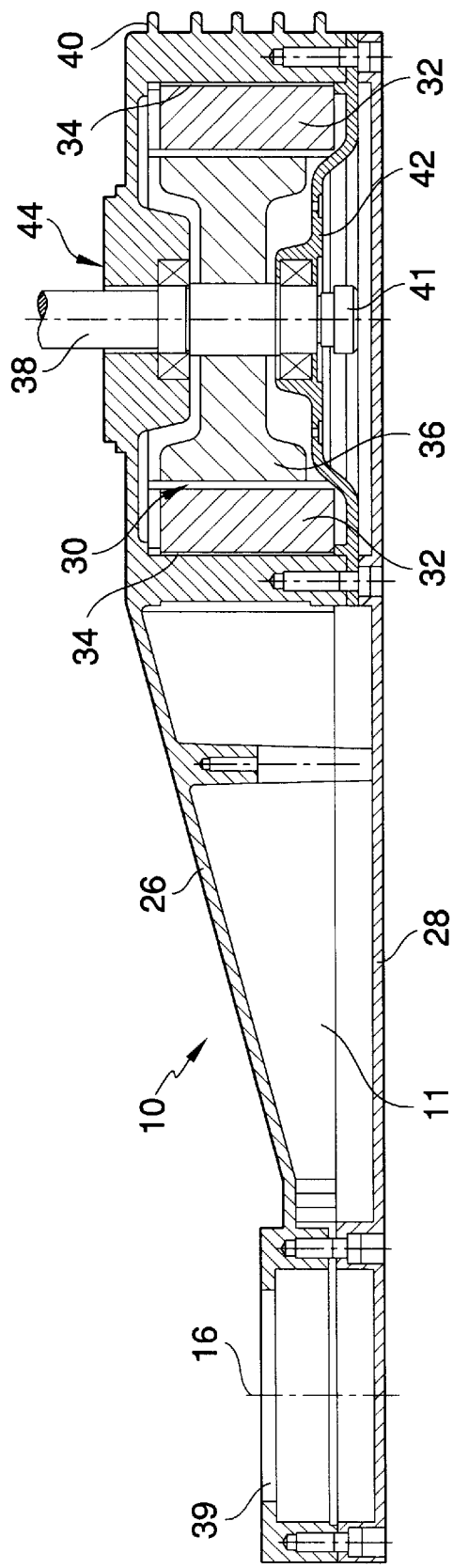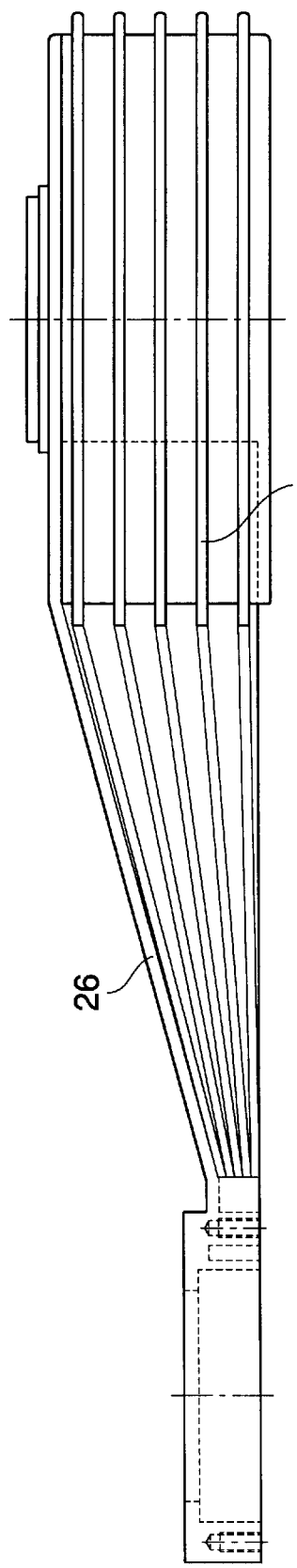
FIG. 4
FIG. 5

VEHICLE DRIVE WHEEL ASSEMBLY

FIELD OF THE INVENTION

The present invention relates to a drive wheel assembly for a scooter. More particularly, the invention relates to a scooter wheel driven by a motor housed in a swing arm and directly engaged to a transmission mounted within a sealed but vented gearbox housing that rotates with the wheel, with a heat dissipating member of the swing arm in thermally conductive association with the motor, and in which a second swing arm may be pivoted away from a wheel axle about an axis transverse to the scooter to ease removal of a wheel rim.

BACKGROUND OF THE INVENTION

As exacerbation of air pollution by large numbers of internal combustion vehicles has become a significant concern in large cities, efforts are being made worldwide to provide efficient electric powered vehicles which do not discharge pollutant emissions. Large cities in developing countries which include high concentrations of scooters powered by two stroke engines are particularly affected by vehicle pollution. These two stroke scooters produce large quantities of pollutants and significant noise. Electric powered scooters, on the other hand, offer a means of transportation that emits substantially no pollutants and produces very little noise.

Electric-powered two-wheeled vehicles have been developed. For instance, U.S. Pat. No. 5,272,938 teaches a bicycle with an electric motor mounted inside a front wheel. The motor is disposed within a housing. The motor spins a sun wheel, which spins three planet wheels meshed therewith. The planet wheels are meshed with and rotate against a ring gear that is rotationally fixed to an axle, which is fixed to the bicycle fork. Shafts of the planet wheels are fixed to a swivel block. The rotation of the planet wheels against the fixed ring gear causes the swivel block to rotate about the axle. Through a clutch wheel, the rotating swivel block rotates the housing. The housing is formed from two halves of equal diameter. Wheel spokes are attached to the housing through both housing halves. Thus, rotation of the housing causes the bicycle spokes and wheel to turn, propelling the bicycle.

In the arrangement taught in the '938 patent, however, the motor is unusually thin to fit unobtrusively within the wheel. This arrangement precludes an ideally shaped motor, which is significantly wider and more powerful.

Other electric powered vehicles are also taught, for example in U.S. Pat. No. 5,322,141. This reference shows an electric motor housed within a closed casing that is connected to a passenger carrying vehicle through suspension members which are pivoted laterally from the vehicle and from the casing. A shock absorber absorbs mechanical shocks between the casing and the vehicle.

The arrangement taught fails to take advantage of the suspension members to dissipate heat from the motor. Additionally, this teaching is unsuitable for a scooter or other small vehicles in which swing arms face aft and pivot parallel to the wheel about an axis transverse to the vehicle.

U.S. Pat. No. 4,132,281 discloses a motorcycle drive wheel that is connected on one side to a vehicle frame and on the other side to an arm. A motor is disposed within the wheel and attached to the arm through a pivot. The pivot is fixed to a concave side of the arm. Thus, to change a tire, the arm must be moved laterally away from the wheel, parallel to the axis of rotation of the wheel, to permit removal of the tire.

U.S. Pat. Nos. 5,613,569 and 5,647,450 teach electrically powered scooters, each with an electric motor placed in a pivotable swing power unit attached to a main frame and to a wheel. The motor is located at the end of the swing unit attached to the body. As explained in the '569 patent, this placement requires a transmission to provide power to the wheel disposed within the swing unit, such as a belt. The remote placement of the motor from the wheel and the long transmission reduces the potential efficiency of the drive system.

U.S. Pat. No. 3,387,502 teaches a gear reduction drive unit for heavy off-road work vehicles with electric motors. The reference shows a planetary drive system with an outer oil reservoir and a sump chamber with passages formed therebetween. Turbulence generated as the wheel turns lubricates the moving parts and particles reaching the sump chamber remain separated from the gears. However, teachings are not present that provide adequate equalization of pressures between the atmosphere and within the gearbox so that the gearbox may be sealed with lubricant for life.

An efficient drive wheel assembly is needed for a scooter that takes advantage of increased surface areas for dissipating motor heat, and in which wheel removal is easily accomplished, and with adequate venting within a gearbox to provide atmospheric pressures therein.

SUMMARY OF THE INVENTION

The invention provides a vehicle drive assembly for a drivable wheel of an electrically powered scooter. First and second swing arms are connectable to a portion of the scooter, such as a scooter body, to support the body on a wheel. The swing arms are pivotable about an axis transverse to the scooter body and are configured with shock absorbers to absorb mechanical shocks between the wheel and the body.

The first swing arm includes a heat dissipating member. A motor, which is preferably housed within the first swing arm, is in thermally conductive association with the heat dissipating member and is configured and positioned to drive the wheel. The heat dissipating member is configured to dissipate heat generated by the motor.

In the preferred embodiment of the invention, this heat dissipating member includes a plurality of cooling fins extending from the swing arm and exposed to ambient air. To improve cooling efficiency, the cooling fins are generally aligned with predominant local airflow around the fins when the motor is driving the vehicle.

Preferably, the swing arm has an elongated portion that extends substantially between the wheel and the body, with the heat dissipating member located at least in this elongated portion. In addition, the heat dissipating member is preferably disposed at top and bottom sides of the swing arm, and may also be located on the sides.

First and second gearbox halves form a gearbox housing in the wheel, with both halves configured and dimensioned for structurally supporting the transmission. The first gearbox half preferably has a diameter larger than the second gearbox half. A transmission is housed within the gearbox housing and is associatable with a driven shaft, preferably a motor shaft, to transmit torque between the shaft and the gearbox housing. A wheel rim is releasably fixable to the first gearbox half, and preferably only to this half, and transmits torque between the gearbox housing and a road surface through a road engaging member.

This road engaging member is preferably a tire that attaches to the wheel rim, and the wheel rim defines a central opening that is larger than the second gearbox half. Thus, the wheel rim is detachable from the first gearbox half with the second gearbox half received through the rim opening, while the transmission remains assembled.

The gearbox and transmission are internally lubricated. The gearbox housing is configured for containing lubricant and thus has a lubricant-sealed interior. A lubricant seal is formed between the gearbox housing and a vehicle supporting member, such as the first swing arm. An axial opening in the housing communicates the housing interior with the swing arm. The motor shaft extends into both the swing arm and the housing opening. Additionally, the swing arm includes a vent that communicates the housing opening with the atmosphere, equalizing pressures inside and outside the housing. The vent preferably extends through a wall of the swing arm adjacent the gearbox housing and has a vent opening communicating with the atmosphere at a top portion of the wall, and thus remains generally upright with respect to the scooter.

An annular seal is located between the gearbox halves to seal lubricant radially inside the seal. The gearbox halves of the preferred embodiment are secured to each other by fasteners. To prevent lubricant from leaking through the fastener holes in the gearbox halves, these fasteners are disposed only radially outside the seal.

A vent cap, configured to allow air flow for equalizing pressure inside and outside the gearbox housing while substantially preventing lubricant leakage, caps the vent. The portion of the vent open to the interior of the gearbox housing is preferably aligned generally parallel to the shaft, to reach the gearbox interior above the normal level of the lubricant.

Also, the transmission preferably includes a gear carrier configured to resist rotation caused by the motor, preferably by being fixed to the swing arm. The gear carrier supports a rotatable portion of the transmission, at least one gear of the transmission. The vent includes a vent bore that extends through the gear carrier and is fluidly communicated with the vent extending through the swing arm. The transmission most preferably is a planetary gear arrangement, including a sun gear fixed to the motor shaft, at least one planetary gear mounted to the gear carrier.

The first swing arm itself has a first end fixed to a motor and a second end pivotably and supportively attachable to the scooter body. A substantially rigid elongated portion of the first swing arm fixes together the first and second ends. With the motor mounted in the end of the first swing arm opposite the body, the transmission is directly engaged with the motor shaft, eliminating an inefficient transmission stage between a remotely placed motor and the wheel.

An axle is preferably fixed to the gear carrier and to the second swing arm, extending through the gearbox housing. The axle is attached to the transmission, such that the transmission supports the second swing arm. To ease removal of the wheel rim, the axle is preferably separable from the second swing arm with the second swing arm substantially stationary in a direction coaxial with the axle. Most preferably, the second swing arm must be moved no more than about 0.5 inches coaxially with the axle for separation.

In one embodiment, the axle is fixable to the second swing-arm at an attachment opening of this swing arm, while remaining substantially outside the attachment opening. The axle has diameter larger than the attachment opening to prevent the axle from penetrating the opening. An axle fastening member engages the axle while received in the attachment opening. Furthermore, the axle has an end that defines a substantially axially aligned female threaded portion, and the fastening member includes a male threaded portion that is engageable within the female threaded portion to fix the axle to the second swing arm. Thus, when the fastening member is removed, the swing arm is pivotable about an axis substantially transverse to the scooter, starting from the attached position of the axle and the second swing arm. As the transmission need not be disassembled to separate the axle from the second swing arm, the wheel rim is detachable from the housing towards the second swing arm and is fixable to the first gearbox half on a side facing this swing arm.

In another embodiment the axle is receivable within the attachment opening of the second swing arm and fixable therein. This improves the strength of the axle and second swing arm attachment.

BRIEF DESCRIPTION OF THE DRAWINGS

FIG. 4 is a cross-sectional top view of a the left swing arm of the scooter;

FIG. 5 is a top view of the swing arm of FIG. 4;

DETAILED DESCRIPTION OF THE PREFERRED EMBODIMENTS

Figure 1:
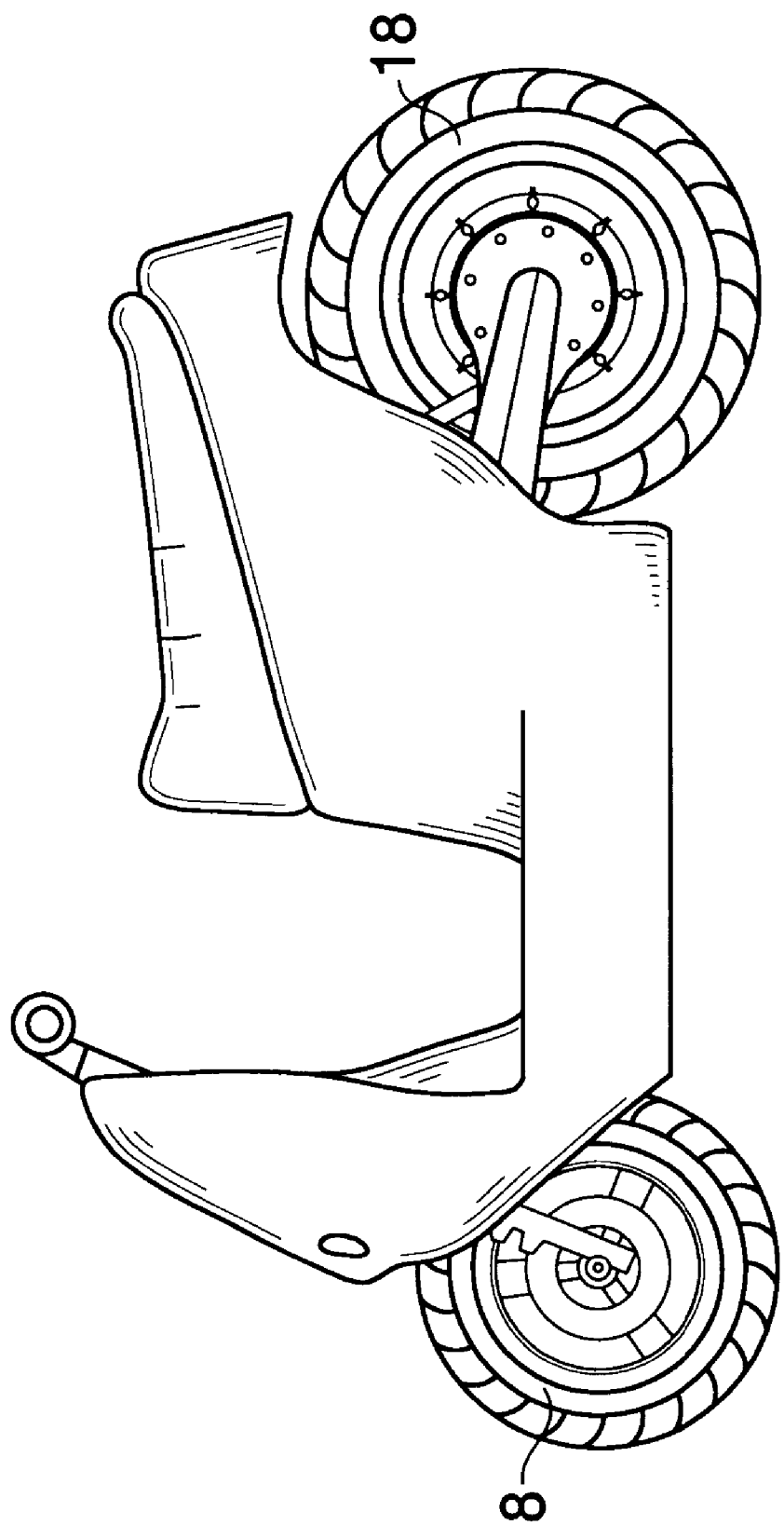
FIG. 1 is a left side view of a scooter according to the invention.

FIG. 1 shows a scooter according to the invention with two wheels, a front steerable wheel 8 and a rear drive wheel 18.

Figure 2:
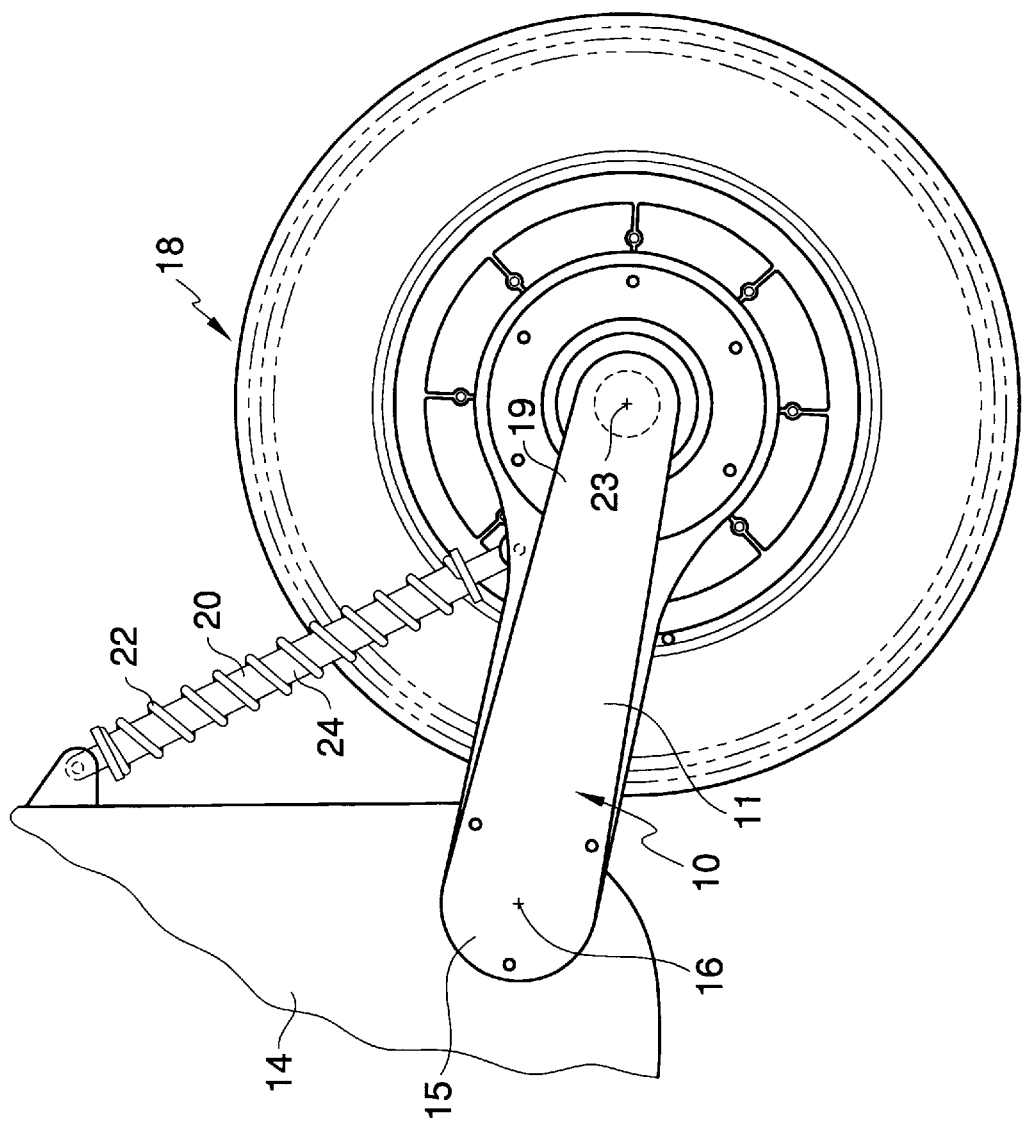
FIG. 2 is a left side view of a drive wheel assembly of the scooter.
Figure 3:
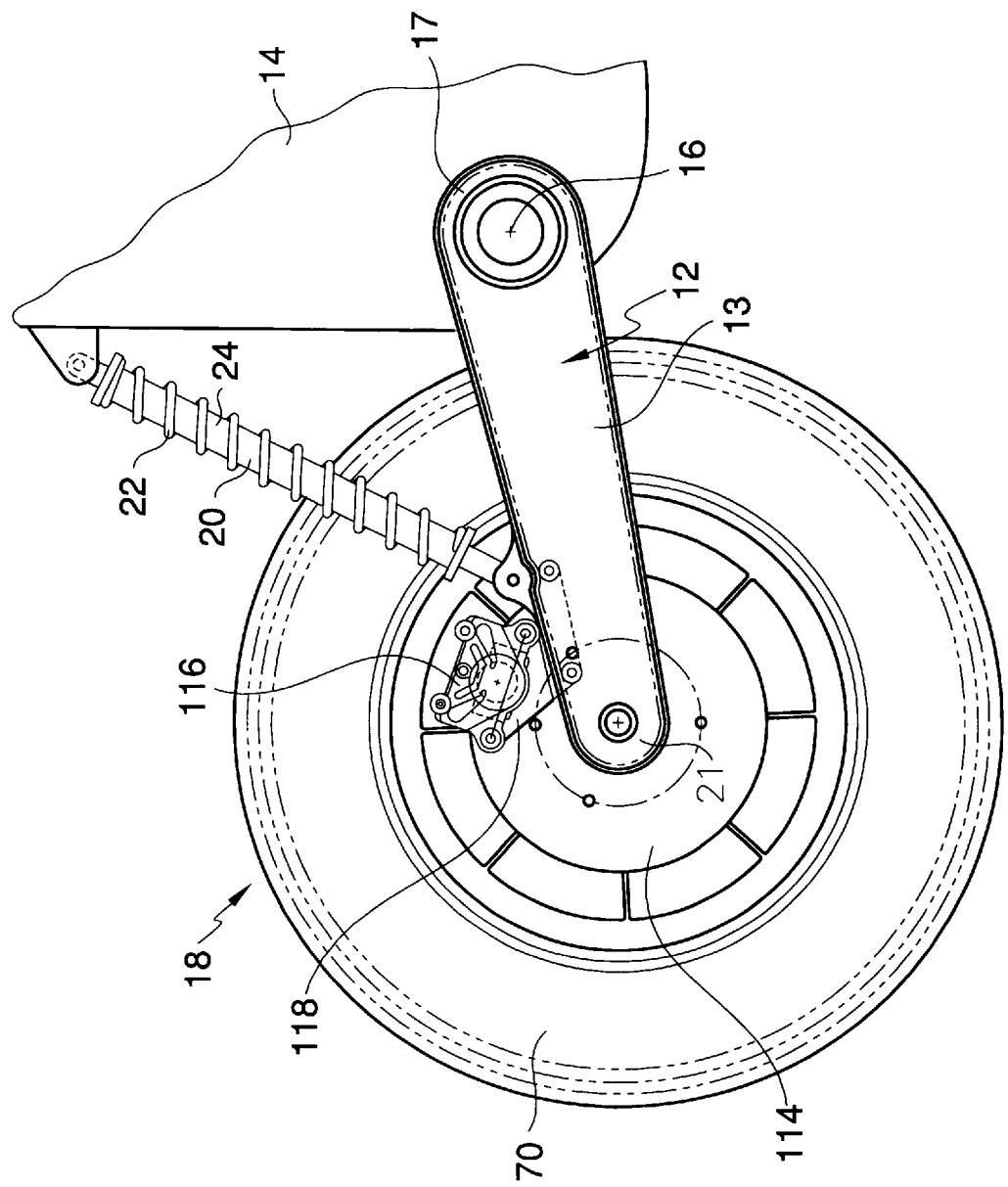
FIG. 3 is a right side view of the drive wheel assembly.

Referring to FIGS. 2 and 3, left and right swing arms 10 and 12 are pivotably connected to a scooter body 14 around a pivot axis 16. The swing arms 10 and 12 are also connected to a wheel 18, thus pivotably attaching the wheel 18 to the body 14 for pivoting in a pivot plane disposed substantially in parallel with rotation of the wheel 18, about an axis substantially parallel to wheel axis 23 and substantially transverse to the scooter. The swing arms 10 and 12 have rigid elongated portions 11 and 13 that join swing-arm body-ends 15 and 17 and wheel ends 19 and 21, which are respectively rotatably attached to the scooter body 14 and to the wheel 18.

Shock absorbers 20 are connected between the swing arms 10 and 12 and the body 14 to absorb mechanical shocks therebetween. Preferably, the shock absorbers 20 include springs 22 as well as dampers 24 to both support the swing arms 10 and 12 and dampen movement between them and the body 14.

Referring to FIG. 4, the left swing arm 10 includes a swing arm frame 26 to which is fixed a cover 28. The swing arm frame 26 carries structural loads generated from supporting the scooter body 14.

An electric motor 30 is housed within the swing arm frame 26. The motor 30, and preferably at least the motor stator 32, is in thermally conductive association with the swing arm frame 26. In the preferred embodiment, the stator 32 is bonded to the swing arm frame 26 with an adhesive 34. One preferred adhesive is LOCTITE 636, which is an air curable adhesive with a thermal conductivity of 0.1 Watts/(m ° K.) manufactured by the Loctite Corporation. Other materials with different thermal conductivity may alternatively be employed, but materials with higher thermal conductivity are preferred. Also, an alternative embodiment uses an epoxy as the adhesive 34. A motor cover 42 is secured to the swing arm frame 26, enclosing the operating parts of the motor 30. In an alternative embodiment, the motor may be contained in an additional motor housing and mounted within the left swing arm 10. The motor 30 also includes a rotor 36 that is fixed to shaft 38.

Power is preferably supplied to the motor 30 from batteries via motor controller (not shown) in the scooter body 14 through cables (not shown) that pass through an opening 39 in the swing arm frame 26. The controller can alternatively be placed in the left swing arm 10. A Hall effect speed sensor 41 is preferably mounted to the shaft 38 to provide speed and position information to the controller. When the controller supplies electrical current to the motor 30, rotor 36 rotates shaft 38 to drive wheel 18, and the motor 30 generates heat.

A plurality of cooling fins 40 are formed on the swing arm 10, preferably on the swing arm frame 26, and are configured to dissipate heat that is generated by the motor 30 and transmitted to the swing arm 10. Although not present in the preferred embodiment, cooling fins may also be formed on the cover 28. As shown in FIG. 5, the cooling fins 40 extend in general alignment with the local airflow encountered when the scooter is moving forward. Furthermore, the cooling fins 40 extend along the elongated portion 11 of the swing arm 10, taking advantage of the large surface area available in the swing arm 10 to dissipate heat. Other heat dissipating members and radiators in thermally conductive association with the motor 30 may be employed on the swing arm 10.

The swing arm frame 26, and also the cover 28, are preferably made from an aluminum alloy as aluminum is known for its high strength to weight ratio and good thermal conductivity. Other materials, such as composites, may also be employed, but materials with good thermal conductivity are preferred to conduct heat from the motor 30 to the cooling fins.

Figure 6:
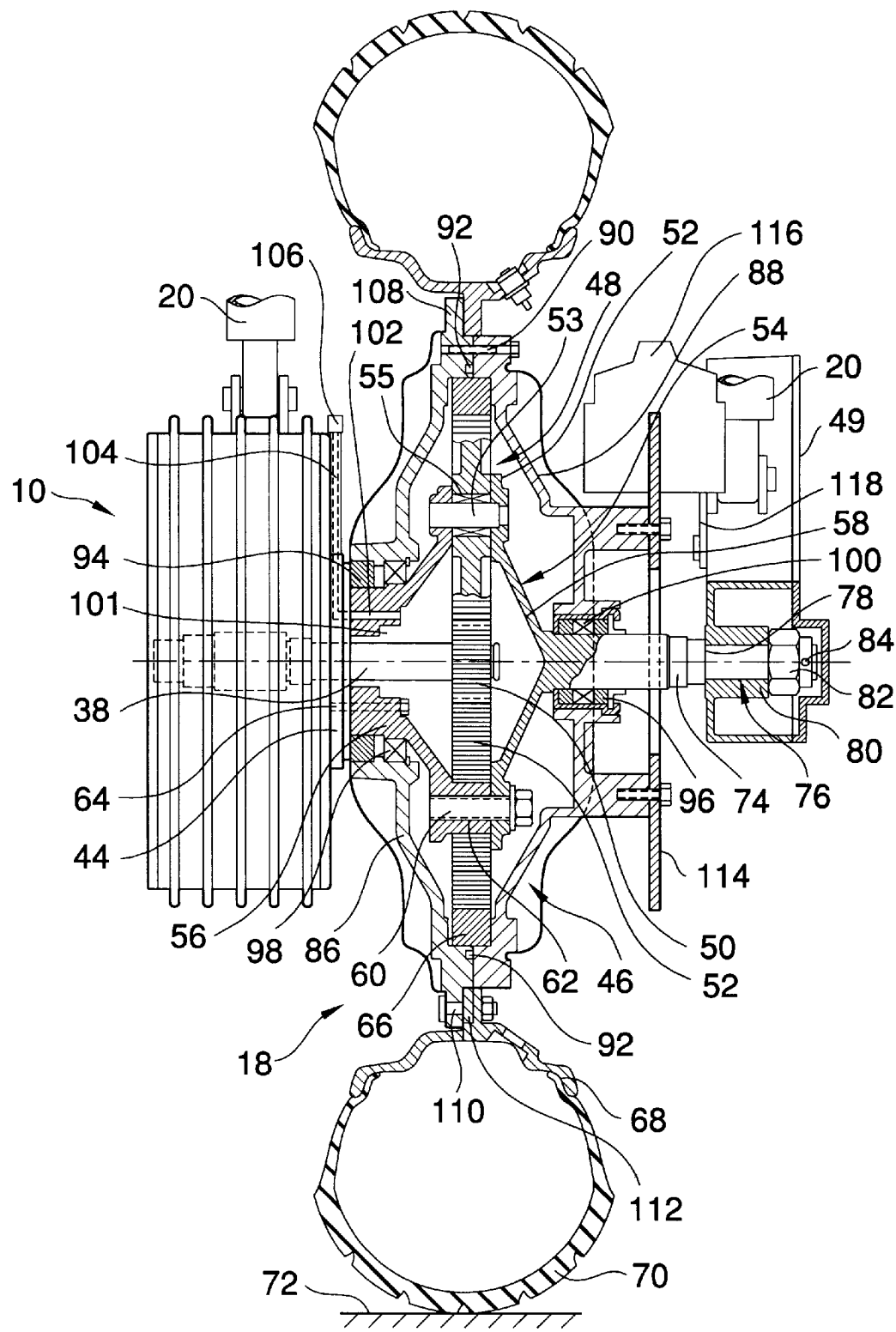
FIG. 6 is a cross-sectional rear view of the drive wheel assembly.

Referring to FIGS. 4 and 6, the frame 26 of the left swing arm 10 has a wall 44 that abuts the wheel 18. As shown in FIG. 6, wheel 18 includes a gearbox housing 46 that houses a wheel transmission 48 therein. The transmission 48 is preferably a planetary gear reduction unit that provides a reduction of between 6:1 and 14:1, according to the motor and wheel size employed. Also shown in FIG. 6 is a right swing arm cover 49, covering the interior of the right swing arm 12.

Figure 7:
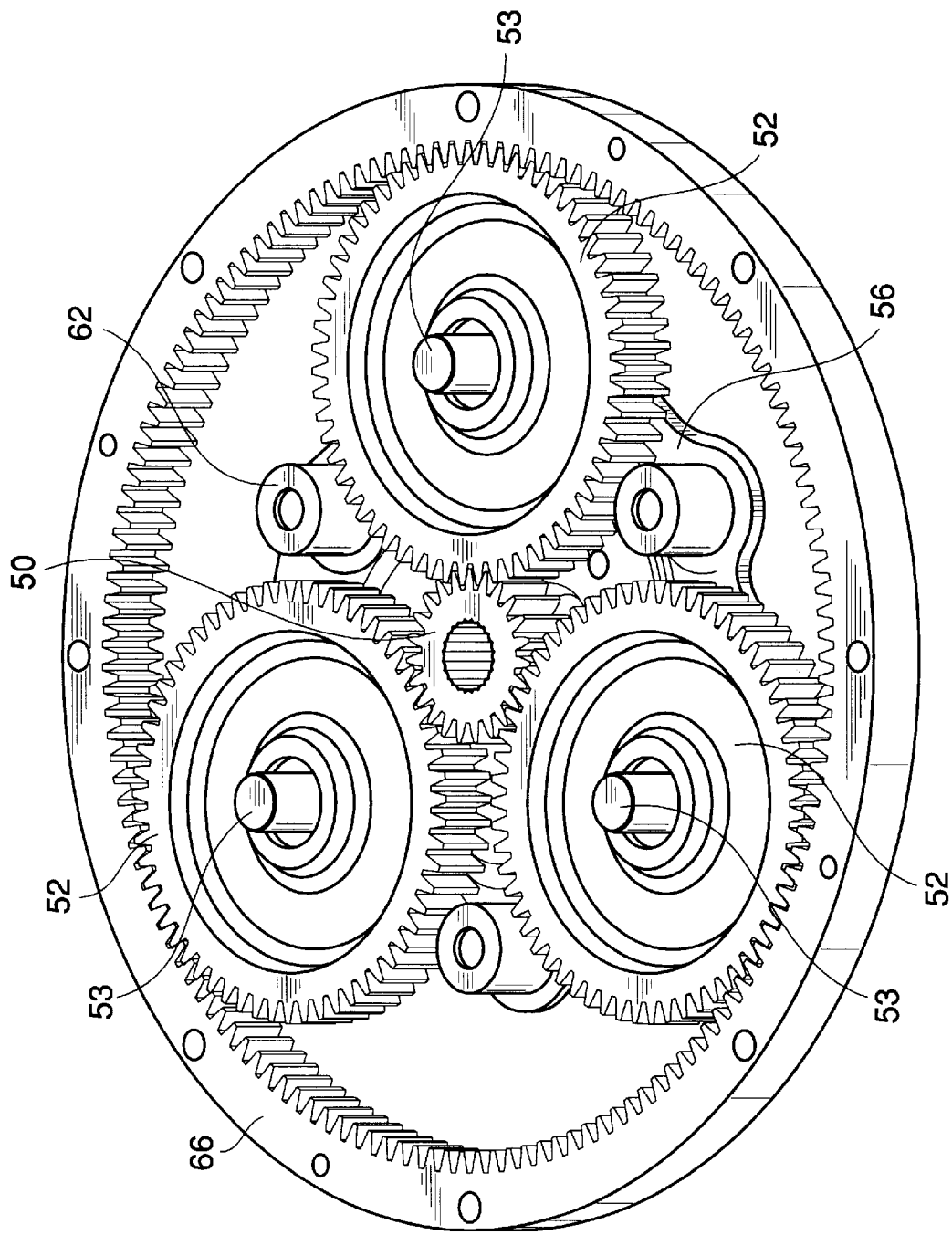
FIG. 7 is a perspective view of the planetary reduction unit of the scooter.

Thus, as shown in FIGS. 6–7, a sun gear 50 is fixed to the shaft 38 driven by the motor 30. The motor shaft 38 is preferably splined hardened steel to reduce torsional strain in the shaft between the motor 30 and the sun gear 50. Planetary gears 52 are mounted on spindles 53 and bearings 55 of gear carrier 54. The gear carrier 54 has left and right halves 56 and 58, which are secured to each other with fasteners 60 that extend through sleeves 62 formed on the left carrier half 56 and held against the right carrier half 58. The planetary gears 52 are meshed with the sun gear 50 and also with a ring gear 66 that is disposed concentrically with the sun gear 50. The ring gear 66 is fixed to the gearbox housing 46, which is itself fixed to a wheel rim 68, to which mounts a road-surface engaging member such as a tire 70.

Preferably, the majority of the planetary gears 52, two of the three in the preferred embodiment, are disposed beneath the sun gear 50 to distribute support of the sun gear 50 amongst as many of the planetary gears 52 as possible. Also, preferably at least one of the planetary gears 52 is disposed above the sun gear 50 for preventing radial displacement thereof when the scooter is driven over rough terrain.

The gear carrier 54 is configured to resist rotation caused by the motor 30. This is accomplished in the preferred embodiment as the gear carrier 54 is fixed to the left swing arm 10 by a plurality of fasteners 64. Thus, torque is transmitted from the motor shaft 38, through the sun gear 50, to the planetary gears 52, then to the ring gear 66 and gearbox housing 46, and finally to a road surface 72, driving the scooter. The gearbox housing 46, being fixed to the wheel rim 68 and tire 70, rotates with the tire 70 as the tire 70 rolls over the road surface 72.

The gear carrier 54 is fixed to an axle 74, which protrudes coaxially from the gearbox housing and into an attachment opening 76 formed in a sleeve 80 of the right swing arm 12. The axle 74 includes a shoulder 78 that has a diameter greater than the opening 76 and rests against the right swing arm 12, limiting penetration of the axle 74 into the opening 76. A castle nut 82 and a cotter pin 84, which extends transversely through the axle 74, secure the axle 74 to the right swing arm 12. Although an alternative embodiment of the scooter has only one swing arm, a second swing arm reduces twisting moments on the swing arms produced by an off-center wheel 18, as forces from the wheel are supported through both swing arms 10 and 12. Another embodiment includes a fork shaped swing arm, in which one forcation is the left swing arm 10, and the other forcation if the right swing arm 12.

The gearbox housing 46 includes left and right halves 86 and 88 fixed to each other with fasteners 90 and structurally supporting a portion of the transmission 48. The interior of the gearbox housing 46 contains a lubricant, preferably a lubricating oil filling the lower quarter to half of the gearbox housing 46 interior. An annular seal 92 extends between the gearbox halves 86 and 88, sealing the lubricant within the interior of the gearbox housing 46. The fasteners 90 are disposed radially outside seal 90 to eliminate the possibility of lubricant leaking from the bores in which the fasteners 90 are placed.

Seals 94 seal the space between the gearbox housing 46 and the left swing arm 12, and seals 96 seal the space between the gearbox housing 46 and the axle 74. Bearings 98 and 100 permit rotation between the gearbox housing 46 and the gear carrier 54, or axle 74. Preferably the bearings 98 and 100 are ball bearings.

To equalize inside and outside the gearbox housing 46, the housing interior is vented to the atmosphere. The gearbox housing 46 defines an axial opening 101 that communicates the gearbox interior with the first swing arm wall 44. The gear carrier 54 defines a vent bore 102 that is aligned and fluidly communicated with a hollow venting tube 104 in the wall 44 of the left swing arm 10. The vent bore 102 preferably extends parallel to the motor shaft 38. A vent cap 105 covers the open end of the venting tube 104 to permit passage of air, in order to equalize pressure, but to prevent leakage of lubricant through the cap 106. Together, the vent bore 102 and the venting tube 106 form a vent. This arrangement permits the gearbox housing 46 to be filled with the required lubricant and sealed for the life of the scooter wheel 18, while providing a vent that does not rotate with the gearbox housing 46.

The vent bore 102 is located through a side of the left carrier half 56 above the motor shaft 38. A higher placement of the vent bore 102 maintains the vent opening communicated to the interior of the gearbox housing 46 above the normal level of the lubricant. Similarly, the venting tube 104 is preferably generally vertical, extending upwardly from the connection with the vent bore 102, to keep lubricant from pooling therein. Thus, the vent is open to the atmosphere at the top of the left swing arm 10. As the gearbox housing 46 rotates, lubricant is drawn upwardly by the radial edges of the housing 46 and the ring gear 66, lubricating the moving parts within the gearbox housing 46.

The left gearbox half 86 includes a radially extending lip 108 that is disposed left of center in the wheel 18, providing the left gearbox half 86 with a larger diameter than the right gearbox half 88. Fasteners 110 secure the wheel rim 68 to lip 108 of the left gearbox half 86. By separating the axle 74 from the right swing arm 12 and removing the fasteners 110, the wheel rim is separable from the remainder of the scooter, without disassembling the gearbox housing 46 or the motor 30. When the wheel rim 68 is separated from the gearbox housing 46, right gearbox half 88 is received through central opening 112 in the wheel rim 68 as the wheel rim 68 is slid over the right gearbox half 88.

Figure 8:
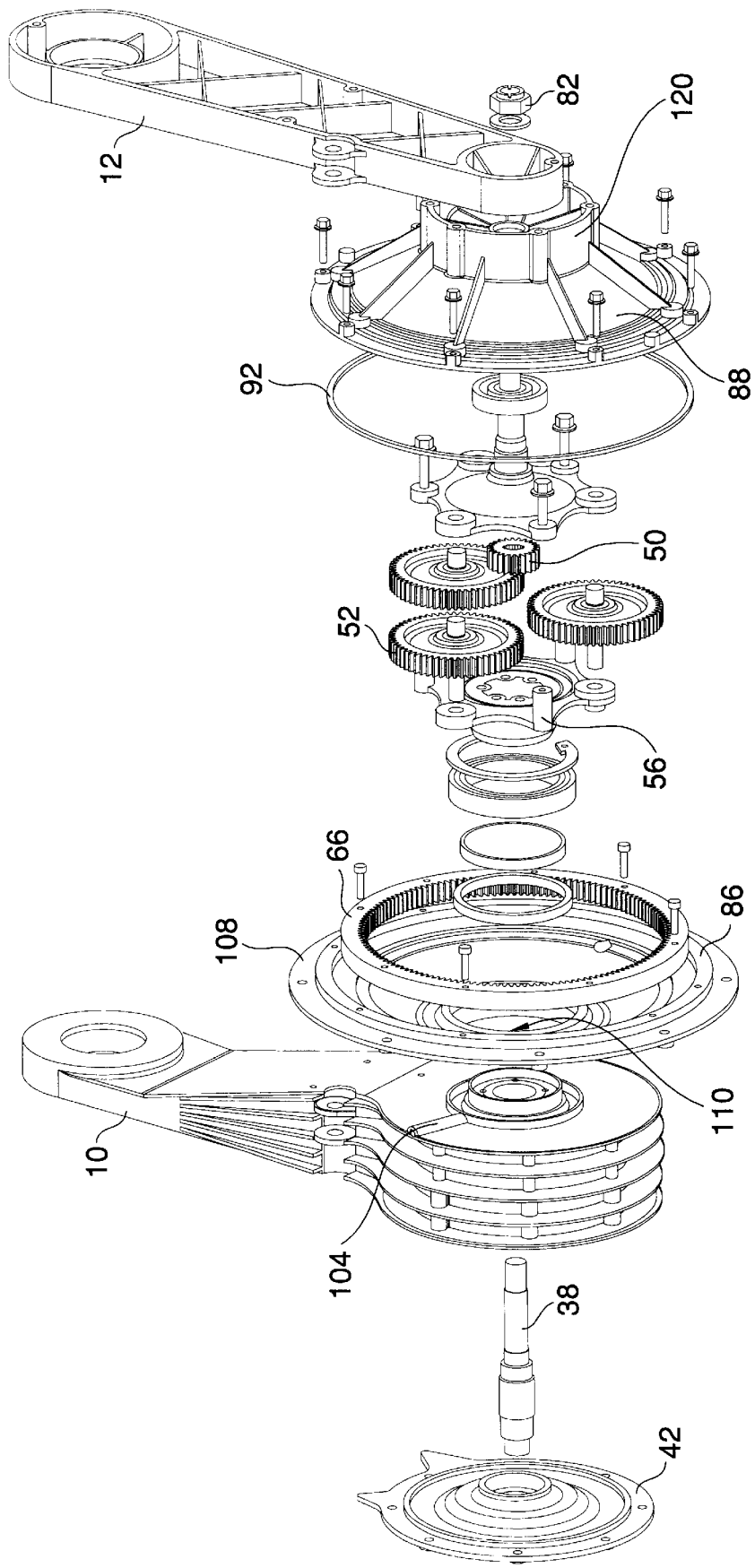
FIG. 8 is an exploded view of the drive wheel assembly.

The preferred embodiment provides a disk brake assembly on the right side of the wheel 18. A brake disk 114 is fixed to the right gearbox half 88, as shown in FIGS. 2 and 6. A brake calliper 116 is mounted to the right swing arm 12 via a plate 118. As shown in FIG. 8, which omits the brake assembly but displays the right gearbox half 88, the right gearbox half 88 has a webbed, cylindrical, coaxial extension 120 that firmly supports the brake disk 114.

Figure 9:
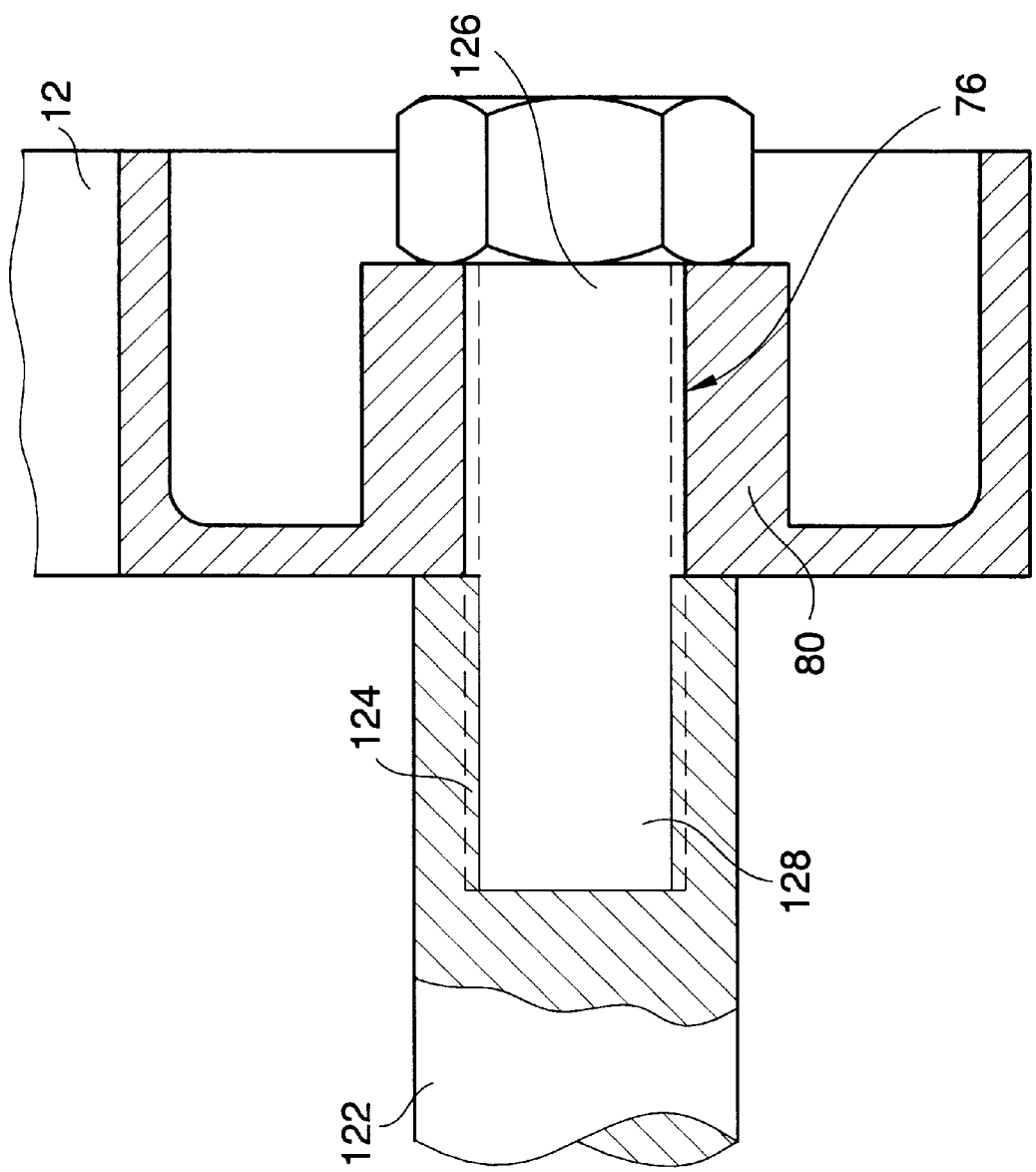
FIG. 9 is a cross-sectional rear view of an alternative embodiment of an axle according to the invention.

FIG. 9 shows an embodiment of the invention with an alternative attachment between the axle and the right swing arm 12. Axle 122 of this embodiment has a diameter larger than the opening 76 through the right swing-arm sleeve 80 so that the axle 122 is not receivable therein. The axle 122 has a female threaded portion 124, and an axle fastening member 126 with a male threaded portion 128 is secured therewithin, fixing the axle 122 to the right swing arm 12. Thus, the axle 122 and the right swing arm 12 are shown in an attached position.

The embodiment shown in FIG. 9 facilitates removal of the wheel rim 68 from the gearbox housing 46. Once fastening member 126 is separated from the axle 122, substantially no lateral motion of the right swing arm 12 is necessary to separate the axle 122 therefrom, because the axle 122 does not penetrate the right swing arm 12. When the right swing arm 12 is released from the axle 122, the right swing arm 12 is free to pivot away from the axle 122 in a substantially vertical direction, parallel to the plane of rotation of the wheel 18. The right shock absorber 20 may be removed to allow the right swing arm 12 to pivot from the attached position, past the radial extent of the tire 70, permitting removal of the wheel rim 68 and tire 70. In embodiments in which the axle does penetrate the right swing arm 12 to a limited degree, preferably less than about 0.5 inches of lateral movement of the right swing arm 12 generally coaxial with the axle is required for the right swing arm 12 to clear the axle.

One of ordinary skill in the art can envision numerous variations and modifications. For example, an alternative embodiment may have only the left swing arm 10, or the elements described as being on the left and right sides of the scooter may be reversed. All of these modifications are contemplated by the true spirit and scope of the following claims.

What is claimed is:

1. A vehicle drive assembly comprising:

a drivable wheel;

a swing arm pivotably connectable to a portion of a vehicle at a pivot location for supporting the portion of the vehicle on the wheel, the swing arm including a heat dissipating member; and a motor disposed remotely from the pivot location in thermally conductive association with the heat dissipating member and configured and positioned for driving the wheel, wherein the motor includes a motor shaft that is drivable by the motor and is disposed coaxially with the wheel;

wherein the heat dissipating member is configured and positioned for dissipating heat generated by the motor.

2. The wheel assembly of claim 1, wherein the heat dissipating member comprises a plurality of cooling fins extending from the swing arm.

3. The drive assembly of claim 2, wherein the cooling fins are generally aligned with predominant local airflow around the fins when the motor is driving the vehicle.

4. The drive assembly of claim 1, wherein the swing arm has an elongated portion extending substantially between the wheel and the body, wherein the heat dissipating member is disposed at least in the elongated portion, and the motor is disposed beyond the elongated portion.

5. The drive assembly of claim 4, wherein the heat dissipating member is disposed along top and bottom sides of the swing arm.

6. The drive assembly of claim 1, wherein swing arm is pivotably connectable to the portion of the vehicle for pivoting about an axis substantially transverse to the vehicle.

7. The drive assembly of claim 1, further comprising a shock absorbing assembly connected with the swing arm and the portion of the vehicle and configured for absorbing shocks therebetween.

8. The drive assembly of claim 1, wherein the motor comprises an electric motor.

9. A vehicle drive assembly, comprising:

a drivable wheel;

a swing arm pivotably connectable to a portion of a vehicle at a pivot location for supporting the portion of the vehicle on the wheel, the swing arm including a heat dissipating member; and a motor housed substantially within the swing arm in thermally conductive association with the heat dissipating member and configured and positioned for driving the wheel;

wherein the heat dissipating member is configured and positioned for dissipating heat generated by the motor.

10. A vehicle wheel comprising:

a gearbox housing including first and second gearbox halves, the first gearbox half having a diameter larger than the second gearbox half;

a transmission housed within the housing and associatable with a driven shaft for transmitting torque between the driven shaft and the housing; and a wheel rim releasably fixable to the first gearbox half for transmitting torque between the gearbox housing and a road surface through a road engaging member;

wherein both gearbox halves are configured and dimensioned for structurally supporting the transmission.

11. The wheel of claim 10, wherein the road engaging member is a tire, the wheel rim is configured for attaching the tire thereto and being detachable from the first gearbox half while the transmission remains assembled.

12. The wheel of claim 10, wherein the wheel rim defines a central opening larger than the second gearbox half such that the second gearbox half is receivable within the central opening as the wheel rim is detached from the first gearbox half.

13. The wheel of claim 10, wherein the wheel rim is releasably fixable only to the first gearbox half.

14. A drive assembly, comprising:
the wheel of claim 10; and
a swing arm pivotably supportably connectable to the wheel and to a vehicle body pivotably about an axis substantially transverse to the vehicle body.

15. A vehicle, comprising:
the drive assembly of claim 14; and
the vehicle body;
wherein the vehicle includes a single front wheel.

16. An internally lubricated wheel assembly of a vehicle, the wheel comprising:
a vehicle support member configured for supporting a vehicle body and remaining generally upright with respect thereto;
a gearbox housing configured for containing lubricant, having a lubricant-sealed interior, and being disposed relative to the support member such that a lubricant seal is formed therebetween, the housing defining an axial opening communicating the housing interior with the support member;
a driven shaft extending into both the support member and the housing opening; and
a transmission housed within the housing and associated with a driven shaft for transmitting torque between the driven shaft and the housing, wherein the housing is configured for transmitting torque between the transmission and a road surface through a road engaging member;
wherein the support member supports a vent communicating the housing opening with the atmosphere and configured for equalizing pressures inside and outside the housing.

17. The wheel assembly of claim 16, wherein the support member includes a wall disposed adjacent the gearbox housing and the vent has a vent opening extending through the wall and communicating with the atmosphere at a top portion of the support member wall.

18. The wheel assembly of claim 16, wherein the gearbox housing comprises first and second gearbox halves and an annular seal disposed therebetween and configured from sealing lubricant within the gearbox housing radially inside the seal, wherein the gearbox halves are securable to each other by fasteners extending through each gearbox half only radially outside the annular seal.

19. The wheel assembly of claim 16, wherein the transmission comprises:
a gear carrier fixed to the support member and defining a vent bore fluidly communicating the gearbox interior with the vent of the support member; and
a plurality of gears operatively associated with the shaft and the gearbox housing such that torque is transmitted between the shaft and the gearbox housing;
wherein at least one of the gears is mounted to the gear carrier.

20. The wheel assembly of claim 19, wherein the plurality of gears includes a sun gear fixed to the shaft, at least one planetary gear mounted to the gear carrier, and a ring gear fixed to the gearbox housing.

21. The wheel assembly of claim 16, wherein the vent includes a vent cap configured for permitting air flow for equalizing pressure inside and outside the gearbox housing while substantially preventing lubricant leakage.

22. The wheel assembly of claim 15, wherein the vent includes a portion that is open to the interior of the housing and is aligned generally parallel to the shaft.

23. The wheel assembly of claim 16, wherein the support member is a swing arm pivotably attachable to a body of the vehicle and configured for absorbing mechanical shocks produced therebetween.

24. The wheel assembly of claim 14, further comprising a motor housed within the support member and associated with the shaft for rotationally driving the shaft.

25. A vehicle drive assembly comprising:
first and second swing arms pivotably and supportively attachable to a vehicle body;
a motor configured for driving the vehicle and including a rotatably driven motor shaft;
a gearbox housing configured for transmitting torque to a road surface through a road engaging member;
a transmission operatively associated with the motor shaft and housed within the gearbox housing and configured for transmitting torque from the motor shaft to the housing; and
an axle separably fixed to the second swing arm, received within the gearbox housing, and attached to the transmission such that the second swing arm is supported by the transmission;
wherein the axle and the second swing arm are configured such that they are separable from each other while the second swing arm is substantially stationary in a direction coaxial with the axle.

26. The wheel assembly of claim 25, wherein the axle is separable from the second swing arm with the second swing arm being moved less than about 0.5 inch in a direction coaxial with the axle.

27. The wheel assembly of claim 25, wherein the transmission includes a gear carrier fixed to the axle and configured for resisting rotation caused by the motor, wherein a rotatable portion of the transmission is mounted to the gear carrier.

28. The wheel assembly of claim 27, wherein the gear carrier is fixed to the first swing arm for resisting rotation caused by the motor.

29. The wheel assembly of claim 25, further comprising a driven shaft rotatably mounted to the first swing arm, extending into the gearbox housing, and configured for rotatably driving the transmission.

30. The wheel assembly of claim 25, wherein the second swing arm defines an attachment opening, and the axle is fixable to the second swing arm adjacent the attachment opening while remaining substantially outside the attachment opening.

31. The wheel assembly of claim 30, wherein the axle has diameter larger than the attachment opening such that the axle is prevented from substantially penetrating the opening.

32. The wheel assembly of claim 30, further comprising an axle fastening member configured for engaging the axle for fixing the axle to the swing arm with the fastening member received in the attachment opening.

33. The wheel assembly of claim 32, wherein the axle has an end that defines a substantially axially aligned female threaded portion, and the fastening member includes a male threaded portion that is engageable within the female threaded portion for fixing the axle to the second swing arm.

34. The wheel assembly of claim 30, wherein the axle and the second swing arm have an attached position when attached to each other, the second swing arm being pivotable about an axis substantially transverse to the vehicle from the attached position when the axle is also in the attached position and released from the second swing arm.

35. The wheel assembly of claim 25, further comprising a wheel rim that is releasably mountable to the housing such that torque is transmittable between the housing to the road surface through the wheel rim.

36. The wheel assembly of claim 35, wherein the wheel rim is configured to be detachable from the housing towards the second swing arm while the transmission remains assembled.

\* \* \* \* \*